United States Patent
Inoue et al.

(12) 
(10) Patent No.: US 6,643,529 B1
(45) Date of Patent: Nov. 4, 2003

(54) PORTABLE RADIO DEVICE

(75) Inventors: Yukinari Inoue, Shizuoka (JP); Koichi Yamamoto, Kanagawa (JP); Akinori Ohira, Kanagawa (JP); Kazuhiro Konishi, Shizuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/556,197

(22) Filed: Apr. 21, 2000

(30) Foreign Application Priority Data

Apr. 23, 1999 (JP) .......................................... 11-116868

(51) Int. Cl.[7] .............................................. H04M 1/00
(52) U.S. Cl. ................. 455/575.4; 455/90.3; 455/550.1
(58) Field of Search .......................... 455/90, 575, 550, 455/73, 347, 130, 575.4, 575.3, 575.8; 379/433.12, 433.13, 433.03, 433.01, 433.11

(56) References Cited

U.S. PATENT DOCUMENTS

| | | | |
|---|---|---|---|
| 5,646,649 A | | 7/1997 | Iwata et al. |
| 5,661,641 A | * | 8/1997 | Shindo ........................ 361/814 |
| 5,742,894 A | * | 4/1998 | Jambhekar et al. ....... 455/575.3 |
| 5,818,924 A | | 10/1998 | King et al. |
| 5,907,615 A | * | 5/1999 | Kaschke ................ 379/433.12 |
| 6,081,595 A | * | 6/2000 | Picaud ........................ 379/446 |
| 6,370,362 B1 | * | 4/2002 | Hansen et al. ................. 455/90 |

FOREIGN PATENT DOCUMENTS

| | | |
|---|---|---|
| EP | 0 763 904 A1 | 3/1997 |
| EP | 0 802 659 A1 | 10/1997 |
| EP | 0 944 219 A2 | 9/1999 |
| GB | 2 235 606 A | 3/1991 |
| GB | 2 235 850 A | 3/1991 |
| GB | 2 275 587 | 8/1994 |
| GB | 2 291 560 | 1/1996 |
| GB | 2 297 662 | 8/1996 |
| GB | 2 310 562 A | 8/1997 |
| GB | 2 334 850 A | 9/1999 |

OTHER PUBLICATIONS

WO 99/12322, Radio Telephone With Sliding Acoustic Member, Mar. 11, 1999.
WO 98/09414, Portable Radiotelephone With Sliding Cover and Automatic Antenna Extension, Mar. 5, 1998.

* cited by examiner

*Primary Examiner*—Edward F. Urban
*Assistant Examiner*—Sonny Trinh
(74) *Attorney, Agent, or Firm*—Pearne & Gordon LLP

(57) ABSTRACT

By providing pressing parts and a transmitting opening part to a cover for covering a key operation part and a transmitter of a housing by sliding, the key operation and the communication in carriage and in ten key operation are enabled, respectively. Moreover, the pressing parts can press different keys in carriage and in ten key operation. Locking nails are provided at the tip of a bowl-like shape, elongating form the end of the cover so that the locking nails are engaged with locking parts for locking with respect to the housing both in the carriage state and in the ten key operation state.

42 Claims, 9 Drawing Sheets

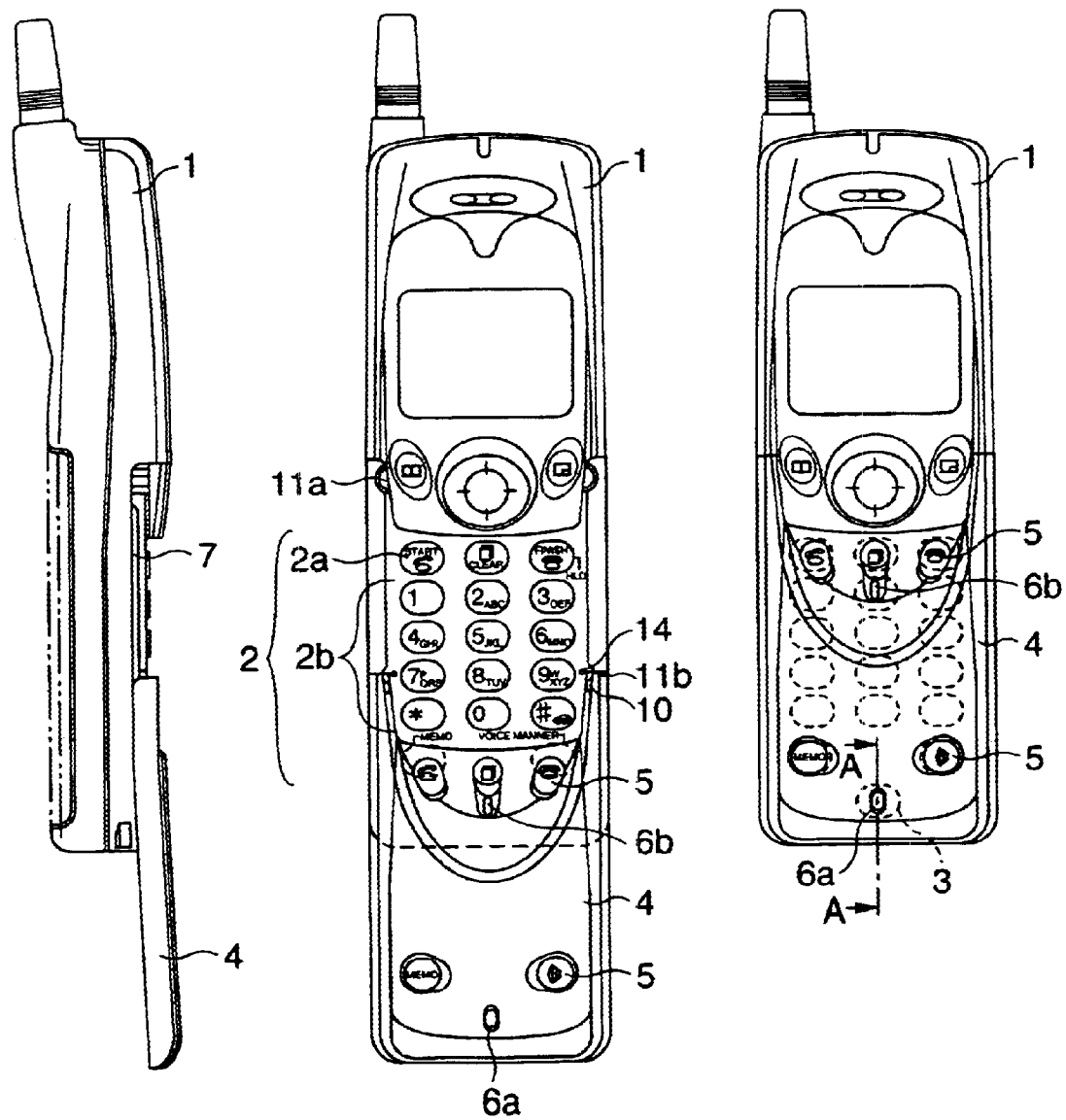

LOCKING PART (UPPER)
(IN CARRIAGE WITH THE COVER CLOSE)

LOCKING PART (LOWER)
(IN TEN KEY OPERATION WITH THE COVER OPENED)

PORTABLE RADIO DEVICE

BACKGROUND OF THE INVENTION

The present invention relates to a portable radio device having a slidable cover, in particular, it relates to that allowing the call in the state the cover is closed.

In conventional portable radio devices, a structure for covering a key operation part using a foldable structure or a rotatable lid has been adopted for providing a small size during carriage and protection of the key operation part. Furthermore, recently, a structure for covering the key operation part by a slidable cover has also been put into the practical use.

As shown in FIG. 9, a conventional portable radio device having a slidable cover comprises a housing 1 having a key operation part 2 including a transmission starting key 21 and ten keys 2b, and a cover slidable with respect to the housing 1 according to a rail part 7 so that the cover can be moved in the state the key operation part 2 is covered or the state it is exposed. Moreover, a transmitter 3 is provided in the cover 4.

The portable radio device can be carried with a small size with the key operation part protected by closing the cover 4. In starting a transmission, by opening the cover 4 for exposing the key operation part 2, the key operation can be enabled so as to provide the transmission state. At the time, since the transmitter 3 is stored in the cover 4, it can be disposed at the mouth of the user, following the cover 4.

However, according to the conventional configuration, since the key operation part 2 is covered by the cover during carriage, the key operation cannot be enabled immediately. And thus a problem is involved in that the transmission cannot be started without the operation of opening the cover 4 particularly in the case of receiving a call.

Moreover, since the transmitter 3 stored in the cover and the device main body should be energized, a problem arises in that the configuration is complicated and the risk of malfunction and breakage is high.

Furthermore, despite the recent trend toward a smaller size in the portable radio devices, the number of the keys is hardly reduced, and thus the size and the interval of the keys tend to be smaller. As a result, the key operation becomes difficult.

Moreover, recently, in most cases, phone numbers to be called are stored in the memory of a portable radio device so that the number to be called is retrieved from the phone list in the memory for making a call by just pressing the call button, and thus the frequency of using the ten keys for dialing is reduced. However, there are many keys in the key operation part, and as mentioned above, since the size and the interval of the keys are smaller, the risk of making a key operation mistake is high, and thus the merit of making a transmission just by operating a smaller number of keys has not been fully utilized so far.

In order to solve the conventional problems, an object of the invention is to provide a portable radio device allowing the key operation or a transmission with the cover on, with little possibility of breakage or malfunction.

Moreover, another object is to provide a portable radio device with an improved operativity by reducing the number of keys in appearance by covering the ten keys not frequently used so as to reduce the change of operation mistake.

Furthermore, still another object is to provide a portable radio device with a small size without sacrificing the operativity.

Accordingly, in a portable radio device according to the invention, a cover for covering a key operation part comprises key pressing parts at a position corresponding to at least one key in the key operation part.

Moreover, a housing comprises a transmitter part, and the cover for covering the key operation part comprises a transmitting opening at a position corresponding to the transmitting part.

Furthermore, the cover and the housing comprise rails with the cover slidably with respect to the housing in the state the rails are engaged, and a lock mechanism for fixing the cover to the housing at least in the state the key operation part is covered by the cover and the state the key operation part is exposed.

Therefore, the keys can be operated with the cover closed by pressing the key pressing part so as to start a call. By having the key pressing part provided in the cover corresponding only to a limited number of keys, such as the transmission starting key, the number of the keys in appearance can be reduced so that the operativity can be improved.

Moreover, the transmission can be conveyed from the transmitting part with the cover closed.

Furthermore, since the cover can be locked with the cover closed, or the cover can be locked in the state the cover is opened by sliding so as to expose the key operation part, the operativity can be improved.

SUMMARY OF THE INVENTION

According to the present invention, a portable radio device comprising: a housing having a key operation part; a cover for covering the key operation part; and at least a key pressing part formed integrally with the cover, wherein the cover is slidable between first end where the key operation part is covered and second end where a part of the key operation part is exposed, wherein the key pressing part is at a position corresponding at least a key of the key operation part when the cover is disposed the first end or the second end.

Since a first aspect of the invention is a portable radio device comprising a housing having a key operation part, and a slidable cover for covering the key operation part, wherein the cover comprises key pressing parts formed integrally with the cover at a position corresponding to at least one key in the key operation part in the state the key operation part is covered, the key operation can be executed with the cover closed.

Since the cover comprises key pressing parts formed integrally with the cover at a position corresponding to at least one key in the key operation part in the state the key operation part is exposed in a second aspect of the invention, the cover needs not be opened until all the keys in the key operation part are exposed, and thus a small size of the device can be achieved.

Since the key pressing parts are disposed at a position corresponding to other keys in the state the key operation part is covered by the cover in a third aspect of the invention, different keys can be operated by the same key pressing parts in the state the cover is closed and the cover is opened.

Since the keys in the key operation parts to be operated by the key pressing part include a transmission starting key in a fourth aspect of the invention, a call can be started with the cover closed.

Since the key pressing parts are formed integrally with the cover by a two-color molding method using a resin comprising the cover and an elastomer resin comprising the key pressing parts in a fifth aspect of the invention, the number of the components can be reduced according to the integration so as to facilitate the assembly, and further, the risk of breakage can be reduced as well.

Since the housing comprises a press preventing projecting part at a position of at least one of the key pressing parts not corresponding to a key in the case there are key pressing parts corresponding to a key of the key operation part only in the either state the key operation part is covered by the cover or the key operation part is exposed in a sixth aspect of the invention, the risk of excessive deformation of the cover due to press of the key pressing parts can be avoided.

According to the present invention, a portable radio device comprising: a housing having a key operation part; a cover for covering the key operation part; transmitter part on the housing; and a transmitting opening provided on the cover, wherein the cover is slidable between first end where the key operation part is covered and second end where a part of the key operation part is exposed, wherein the transmitting opening is a position corresponding the transmitter part when the cover is located at the first end or the second end.

Since a seventh aspect of the invention is a portable radio device comprising a housing having a key operation part, and a slidable cover for covering the key operation part, wherein the housing comprises a transmitter part, and the cover comprises a transmitting opening at a portion corresponding to the transmitting part in the state the key operation part is covered, the transmission can be enabled with the cover closed.

Since an eighth aspect of the invention is the portable radio device according to any one of the first to sixth aspects, wherein the housing comprises a transmitting part, and the cover comprises a transmitting opening at a portion corresponding to the transmitting part in the state the key operation part is covered, the transmission can be enabled with the cover closed.

Since a ninth aspect of the invention is a portable radio device comprising a housing having a key operation part, and a slidable cover for covering the key operation part, wherein the housing comprises a transmitter part, and the cover comprises a transmitting opening at a portion corresponding to the transmitting part in the state the key operation part is exposed, the transmitter can be protected by the cover even in the case the cover is opened.

Since a tenth aspect of the invention is the portable radio device according to any one of the first to sixth aspects, wherein the housing comprises a transmitter part, and the cover comprises a transmitting opening at a portion corresponding to the transmitting part in the state the key operation part is exposed, the transmitter can be protected by the cover even in the case the cover is opened.

An eleventh aspect of the invention is the portable radio device according to the seventh or eighth aspect, wherein the cover comprises a second transmitting opening at a portion corresponding to the transmitting part in the state the key operation part is exposed, the cover needs not be opened until the transmitting part of the housing is exposed, and thus a small size of the device can be achieved.

Since the cover comprises a cylindrical rib surrounding at least one of the transmitting openings at the side facing to the transmitting part in a twelfth aspect of the invention, the noise leakage of the voice being transmitted can be prevented.

Since the housing comprises a cylindrical rib surrounding the transmitting part in a thirteenth aspect of the invention, the noise leakage of the voice being transmitted can be prevented.

Since the housing comprises a rib to be fitted with the cylindrical rib provided in the cover, surrounding the transmitting part in a fourteenth aspect of the invention, the noise leakage of the voice being transmitted can be prevented.

Since the cover and the housing comprise rails with the cover slidably with respect to the housing in the state the rails are engaged, and a lock mechanism for fixing the cover to the housing at least in the state the key operation part is covered by the cover and the state the key operation part is exposed in a fifteenth aspect of the invention, the movement of the cover can be locked in both closed state and opened state, and thus the operativity can be improved.

Since a sixteenth aspect of the invention is a portable radio device comprising a housing having a key operation part, and a slidable cover for covering an optional portion stored in the housing, wherein the cover and the housing comprise rails with the cover slidably with respect to the housing in the state the rails are engaged, and a lock mechanism for fixing the cover to the housing at least in the state the stored portion is covered by the cover and the state the cover is moved from the state to an optional state, the operativity of the cover can be improved not only in covering the key operation part but also in sliding by utilizing the lock mechanism.

Since the lock mechanism comprises nail parts formed in the cover and lock parts formed in the housing to be engaged with the nail parts, with the nail parts disposed at the tip of a bowl-like part elongating from the end of the cover so as to be engaged with the lock parts, utilizing the elasticity of the cover in a seventeenth aspect of the invention, the number of the components can be reduced so as to simplify the configuration.

Since the rail and the lock parts of the lock mechanism are formed integrally in the housing, and the rail and the nail parts of the lock mechanism are formed integrally in the cover in an eighteenth aspect of the invention, the number of the components can be reduced so as to simplify the configuration as well as to reduce the risk of breakage.

Since projections are provided both in the surface of the housing facing to the cover and in the surface of the cover facing to the housing to be engaged in the state the cover is most spread with respect to the housing for preventing fall-off of the cover from the housing in a nineteenth aspect of the invention, the both projections are contacted with each other so as to serve as a stopper.

Since a projecting shape for forcing up the other projection is added to one of the projections provided in the housing and the cover for preventing backlash of the cover in the state most spread with respect to the housing in a twelfth aspect of the invention, the cover is forced away from the housing in the case the other projection is moved onto the projecting shape so as to eliminate the backlash between the rails.

Since chamfer parts are provided in the range of the rails of the cover and the housing, engaged in the state the cover is most spread with respect to the housing for facilitating attachment or detachment of the cover in a twenty-first aspect of the invention, in the case a force is applied with the detached cover superimposed on a predetermined position of the housing, the rails regain the engaged state so that the cover can be mounted on the housing.

Since the position for locking the slide of the cover is indicated at least at one point of the housing in a twenty-second aspect of the invention, the sliding distance of the cover can be adjusted or the cover can be mounted based on the indicated position.

BRIEF DESCRIPTION OF THE DRAWINGS

FIG. 1A is a plan view of a portable radio device according to a first embodiment of the invention in the state with a cover closed, FIG. 1B is a plan view thereof in the state with the cover opened, and FIG. 1C is a side view thereof in the state with the cover opened.

DETAILED DESCRIPTION OF PREFERRED EMBODIMENTS

Hereinafter embodiments of the invention will be explained with reference to the drawings.

First Embodiment

As shown in FIGS. 1A to 1C, a first embodiment of a portable radio device comprises a cover 4 slidable with respect to a housing. FIG. 1A is a plan view showing the state with the cover 4 closed, FIG. 1B is a plan view showing the state with the cover opened, and FIG. 1C is a side view showing the state with the cover opened.

Figure 2A:
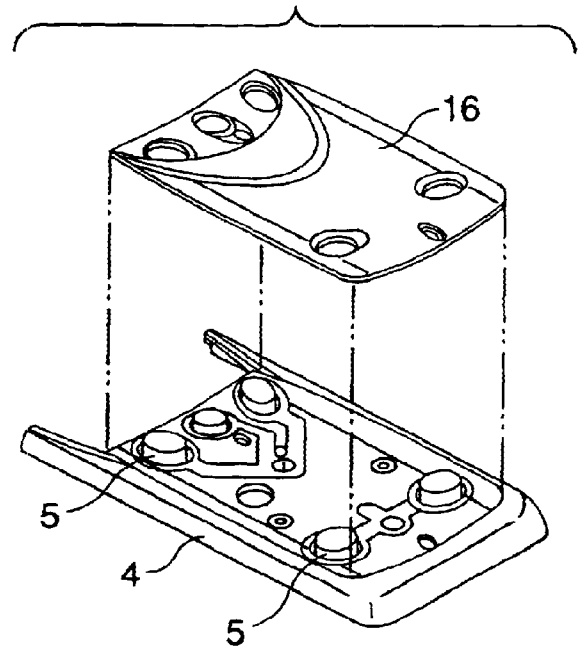
FIG. 2A is a perspective view of the cover formed by a two-color molding method of the portable radio device according to the first embodiment.
Figure 2B:
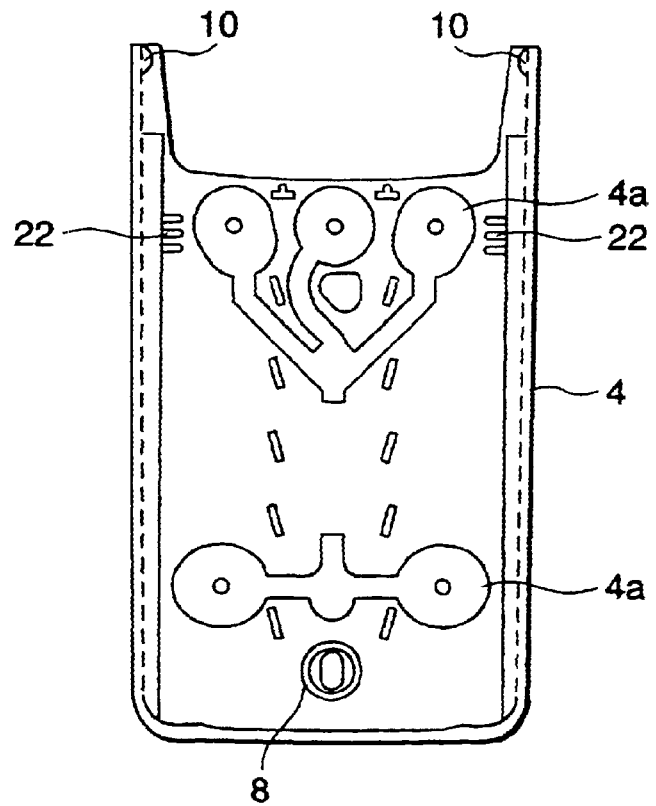
FIG. 2B is a rear view of the cover.

Moreover, FIG. 2A is an exploded perspective view of the cover 4, and FIG. 2B is a rear view of the cover 4. The cover 4 is provided with key pressing parts 5 formed integrally with the cover. When the key pressing parts 5 are pressed, keys of the housing 1 disposed below the key pressing parts 5 are pressed accordingly. The key pressing parts 5 are made from an elastomer resin, which is different from a resin comprising the cover 4. According to the integral molding by a two-color molding method with the two materials, the cover 4 shown in FIGS. 2A and 2B can be produced. Numeral 4a denotes the portion of the elastomer resin. Since border lines appear on the borders of the different materials in the two-color molding, a decoration panel 16 is fitted to the front side of the cover 4 for hiding the border lines. The decoration panel 16 is provided with holes for exposing the key pressing parts 5.

Furthermore, the cover 4 has two openings for transmission (6a, 6b in FIGS. 1A, 1B), and the decoration panel 16 is provided with holed at the positions corresponding to the openings. Numeral 8 in FIG. 2B denotes a cylindrical rib surrounding the opening.

Moreover, the cover 4 comprises a rail part to be engaged with a rail part 7 provided in the housing 1 so that the cover can slide from the state of FIG. 1A to the state of FIG. 1B.

Furthermore, numeral 10 in FIG. 2B denotes a locking nail for positioning the cover 4 with respect to the housing 1, and numeral 22 denotes a stopper projection part. The sliding mechanism and the positioning mechanism of the cover 4 will be explained in detail in the second embodiment.

In contrast, as shown in FIGS. 1A and 1B, the housing 1 is provided with operation keys 2 including a transmission starting key 2a, a clear key, a finish key, ten keys 2b, a memo key, and voice manner key. Further, a transmitter 3 is provided at a lower part of the housing 1.

As shown in FIG. 1A, the five pressing parts 5 of the cover 4 are disposed above the transmission starting key 2a, the clear key, the finish key, the memo key, and the voice manner key in the state with the cover 4 closed so that the user can operate these keys by pressing the pressing parts 5 with the cover 4 closed.

Moreover, the transmitting opening part 6a of the cover 4 is disposed above the transmitter 3 in the state with the cover 4 closed so that the user can transmit a call from the transmitter 3 with the cover 4 closed.

Therefore, even in the case the device is carried with the cover 4 closed, a call can be started by operating the pressing parts 5 of the cover so as to press the transmission starting key 2a without the operation of opening the cover.

Furthermore, as shown in FIG. 1B, the other transmitting opening part 6b of the cover 4 is disposed above the transmitter 3 in the state with the cover 4 opened so that the user can input the voice to the transmitter 3 via the transmitting opening part 6b.

Moreover, two pressing parts 5 out of the five pressing parts 5 of the cover 4 are disposed above the memo key and the voice manner key in the state with the cover 4 opened so that in the case the user operates these keys in the state with the cover 4 opened, he presses the pressing parts 5 disposed thereabove.

Accordingly, when the cover 4 is opened, the pressing parts 5 of the cover 4 are disposed on keys different from those of the case the cover 4 is closed so that a part of the operation keys can be operated from above the cover 4 by pressing the pressing parts 5 even in the state the cover 4 is opened, and thus a small size of the device can be achieved.

Figure 3A:
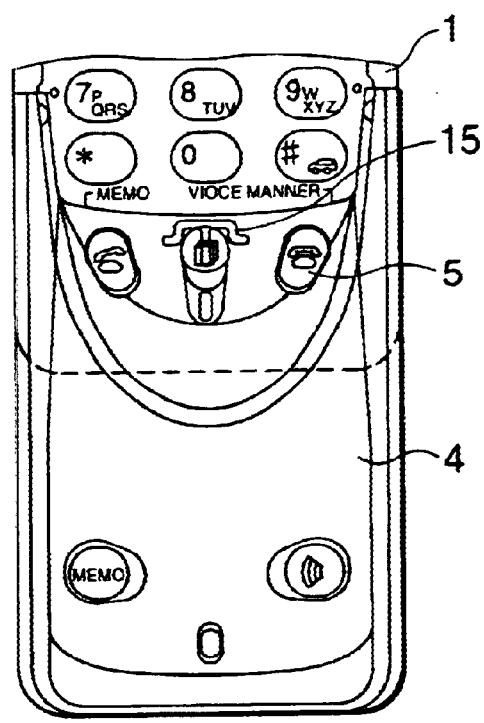
FIG. 3A is a plan view showing the position of disposing a press preventing projecting part in the portable radio device according to the first embodiment.
Figure 3B:
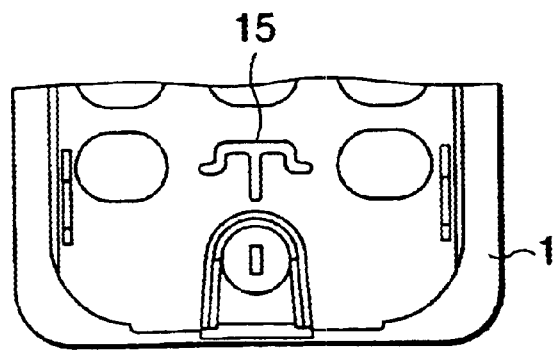
FIG. 3B is a plan view showing a housing with the press preventing projecting part disposed.
Figure 3C:
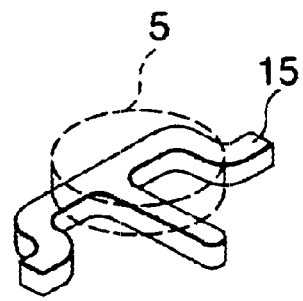
FIG. 3C is a perspective view showing the press preventing projecting part.

In the state with the cover 4 opened (FIG. 1B), no key is disposed below the pressing part 5 between the pressing parts 5 disposed above the memo key and the voice manner key. In the case the pressing part 5 is pressed down in this state, the cover 4 may be deformed excessively so as to be broken. In order to prevent the trouble, as shown in FIG. 3C, a press preventing projecting part 15 for limiting the press down amount of the pressing part 5 is provided immediately below the pressing part 5 of the housing 1 (FIGS. 3A, 3B), the thickness of the press preventing projecting part 15 is substantially same as the projecting amount of the keys in the key operation part 2.

Since the press preventing projecting part 15 is provided, excessive deformation derived from the press operation of the pressing part 5 not to be used can be prevented so that the risk of breakage can be reduced.

Figure 4A:
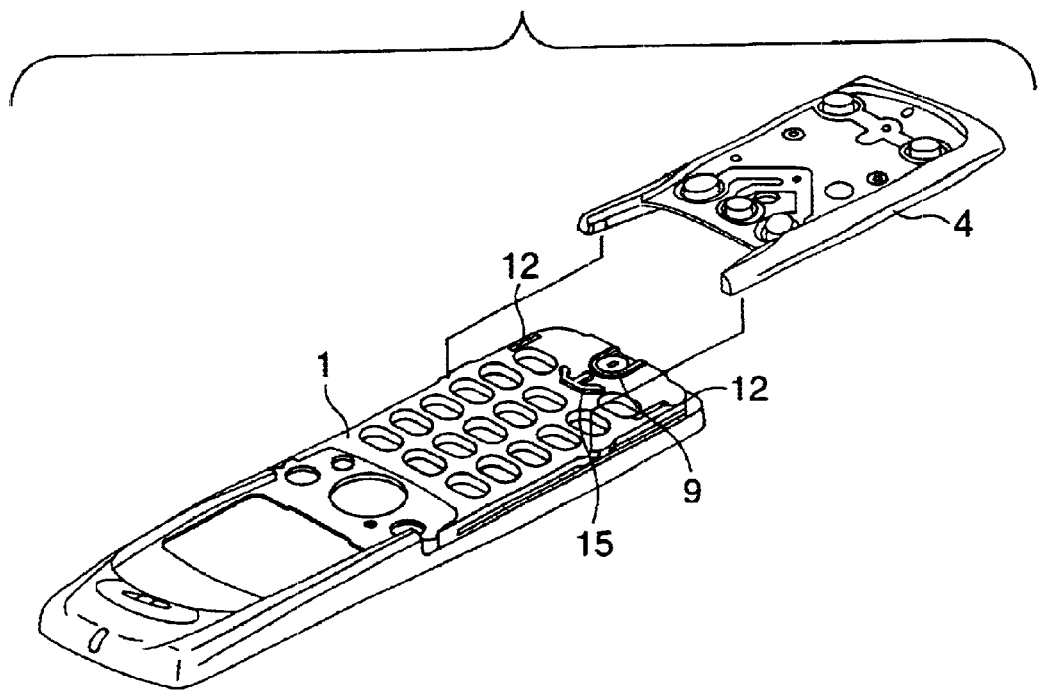
FIG. 4A is a perspective view showing a cylindrical rib provided around a transmitting opening part in the portable radio device according to the first embodiment.
Figure 4B:
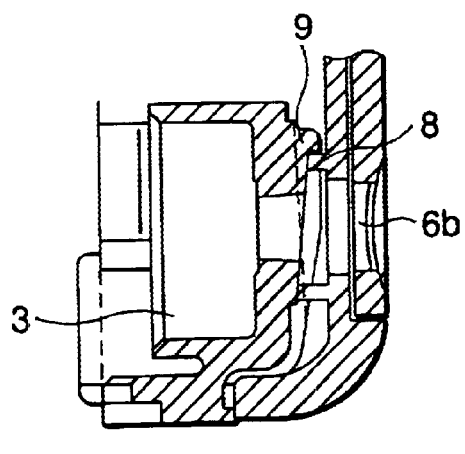
FIG. 4B is a cross-sectional view showing the cylindrical rib provided around the transmitting opening part.
Figure 4C:
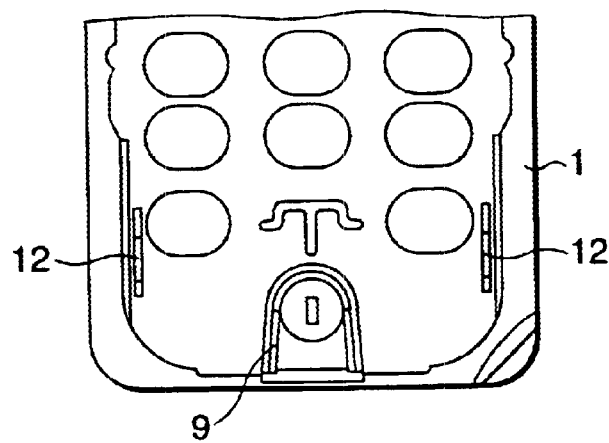
FIG. 4C is a plan view showing the cylindrical rib provided around the transmitting opening part in the housing.

Moreover, as shown in FIG. 4B (a cross-sectional view taken on the line A—A of FIG. 1A), a transmitter 3 is stored inside the housing 1, and a rib 9 is formed around the opening for the transmitter 3 provided in the housing 1, surrounding the half circumference of the opening. In contrast, a cylindrical rib 8 (FIGS. 4B, 2B) is provided around the transmitting opening part 6b of the cover, with the cylindrical rib 8 fitted with the rib 9. Therefore, noise leakage between the transmitting opening part 6b and the transmitter 3 can be prevented so that deterioration of the communication quality can be prevented.

According to the portable radio device, a transmission can be started by operating the pressing parts 5 in the cover 4 with the cover 4 closed. Since the number of the pressing parts 5 is smaller than the number of the keys in the key operation part 2 so that only the communication operations using a small number of keys, such as transmission to a number retrieved in the phone list in the memory, or starting a talk at the time of receipt, can be enabled according to the operation of the pressing parts 5. In other words, since the other keys unnecessary for these communication operations are covered by the cover 4, generation of an operation mistake can be prevented.

Moreover, since the transmitter 3 is stored in the housing 1 in this device, unlike those having a transmitter in the cover side, a simple configuration can be achieved with a less possibility of malfunction. Furthermore, the noise leakage between the transmitting opening part 6b and the transmitter 3 can be prevented owing to the cylindrical rib 8 and the fitting rib 9 so that deterioration of the communication quality can be prevented.

Moreover, since a part of the pressing parts 5 of the cover 4 are disposed on the keys even in the state the cover 4 is slid open so as to expose the key operation part 2 of the housing 1, the part of the operation keys can be operated from above the cover 4 by operating the pressing parts 5 even in the state with the cover 4 opened, and thus a small size of the device can be achieved.

Furthermore, since the cover 4 and the pressing parts 5 are formed integrally, a small size of the device can be achieved as well as the number of the components can be reduced so that the cost can be cut back as well as the risk of breakage can be reduced.

Although the case with the cylindrical rib 8 and the rib fitted has been explained here, it is also possible to provide only the cylindrical rib in either the cover 4 or the housing 1.

Moreover, it is also possible to expose all the keys in the key operation part 2 of the housing 1 in the state with the cover 4 opened.

Furthermore, it is also possible to expose the transmitter 3 in the state with the cover 4 opened, with the cover 4 provided with only the transmitting opening part 6a at a position corresponding to the transmitter 3 in the state with the cover 4 closed.

Second Embodiment

In a second embodiment, the sliding mechanism and the stopper mechanism of the cover in the portable radio device according to the first embodiment will be explained.

Figure 5A:
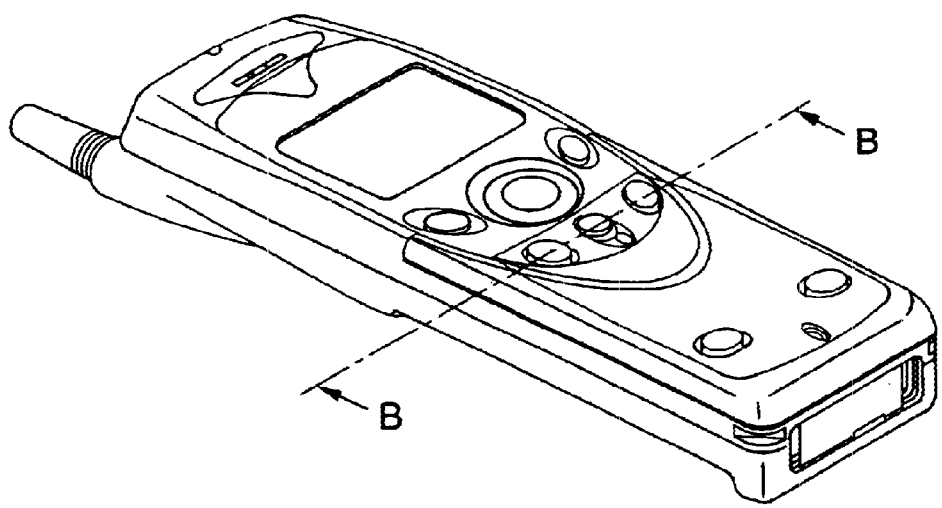
FIG. 5A is a perspective view of a portable radio device according to a second embodiment.
Figure 5B:
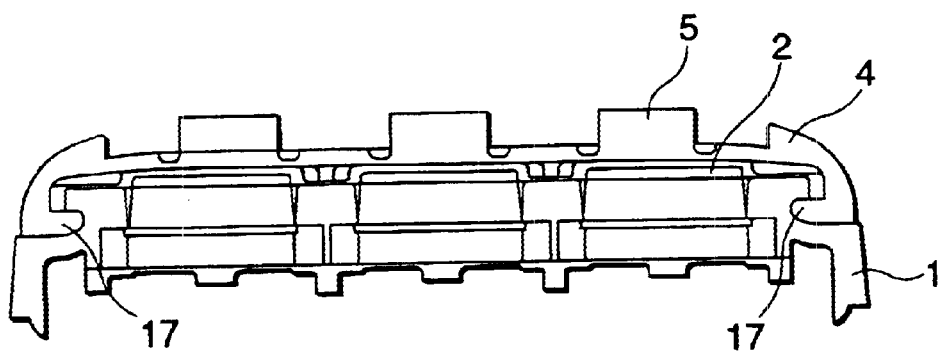
FIG. 5B is a cross-sectional view showing the rail structure thereof, taken on the line B—B.

FIG. 5B shows a cross-section taken on the line B—B of a portable radio device of FIG. 5A. A rail part 17, bent inward is provided along the end rim of the cover 4 along the rail part 7 (FIG. 1C) of the housing. With the rail part 17 engaged with the rail part 7 of the housing 1, the cover 4 can slide with respect to the housing 1 with the engaged state maintained.

Moreover, in order to position the sliding cover 4 with respect to the housing 1, locking nails 10 (FIG. 2B) are provided in the cover 4 at the tip of the bowl-like part elongating from the end of the cover, and further, locking parts 11a and 11b (FIG. 1B) to be engaged with the locking nails 10 are provided integrally in the housing 1. According to the bowl-like shape, elastic force is applied to the locking nails 10 in the inward direction.

Figure 6A:
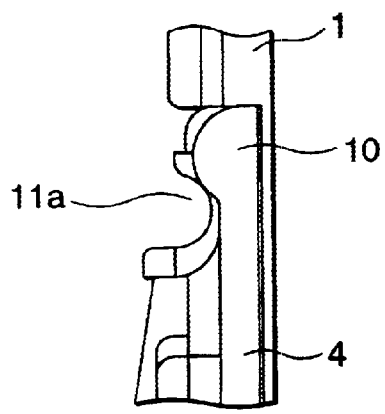
FIG. 6A is a partial enlarged view showing a lock mechanism of the portable radio device according to the second embodiment in the state with the cover closed.
Figure 6B:
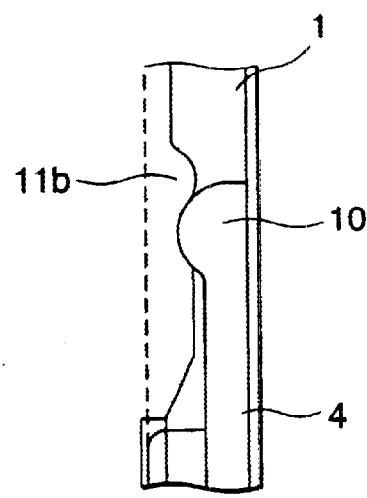
FIG. 6B is a partial enlarged view showing the lock mechanism in the state with the cover opened.
Figure 7A:
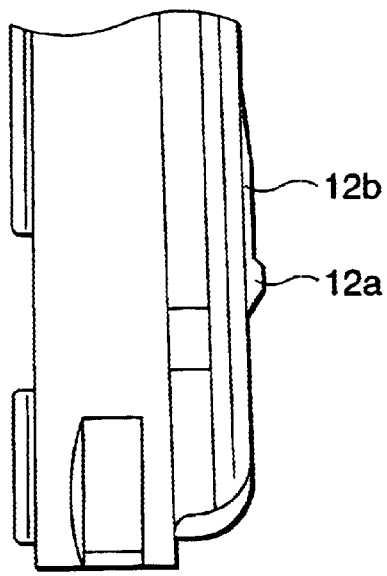
FIG. 7A is a partial enlarged side view showing a stopper projecting part and a backlash preventing part of the portable radio device according to the second embodiment.
Figure 7B:
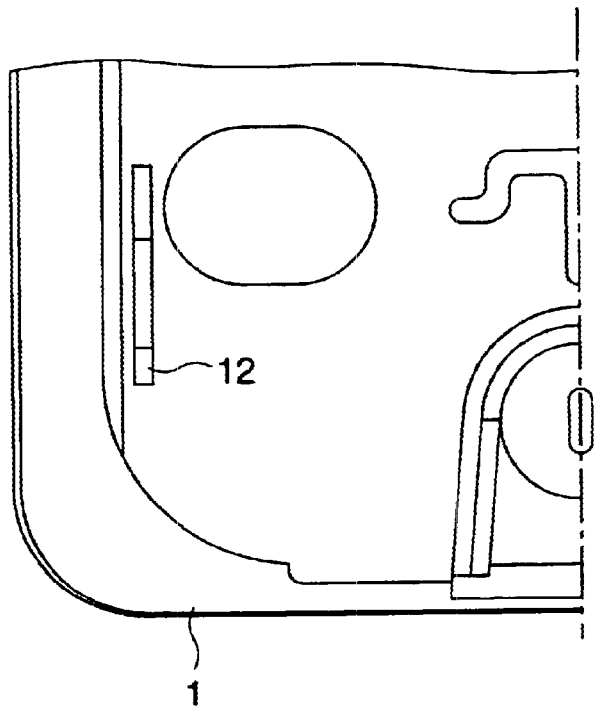
FIG. 7B is a partial enlarged plan view thereof.

The locking nails 10 are engaged with the locking parts 11a in the state the cover 4 covers the key operation part 2 (closed state), and are engaged with the locking parts 11b in the state the cover 4 exposes the key operation part 2 (opened state). FIG. 6A is an enlarged partial plan view of the engaged state of the lock mechanism 11a and the locking nail 10, and FIG. 6B is an enlarged partial plan view of the engaged state of the lock mechanism 11b and the locking nail 10.

Accordingly, since the locking nails 10 formed integrally with the cover 4 are engaged with the locking parts 11a or 11b provided in the housing 1 side, utilizing the elasticity of the cover, the cover 4 can be positioned in the closed state or in the opened state.

Furthermore, stopper projections 12, elongating in the longitudinal direction of the housing 1 are provided on both sides in the lower part of the housing 1 (FIGS. 4A, 4C, 7A, 7B). As shown in a side view of FIG. 7A, the projections 12 include portions 12a with the largest projecting amount and portions 12b with a little projecting amount provided continuously therefrom. The portions 12b with a little projecting amount serve for preventing backlash of the cover 4.

Stopper projections 22 elongating in the shorter side direction of the cover are provided inside the cover 4 (FIG. 2B) so that in the case the cover 4 is slid in the opening direction, the projections 22 are moved onto the backlash preventing parts 12b of the housing 1 so as to eliminate the gap between the rails 7, 17 for eliminating the backlash of the cover 4. Moreover, when the projections 22 contact with the stopper projections 12, the further movement of the cover 4 is inhibited.

Furthermore, in the case a stronger force is applied on the cover 4 in the opened state in the sliding direction, or a strong external force is applied on the cover 4 in the vertical direction, the cover 4 is detached from the hosing 1.

Figure 8A:
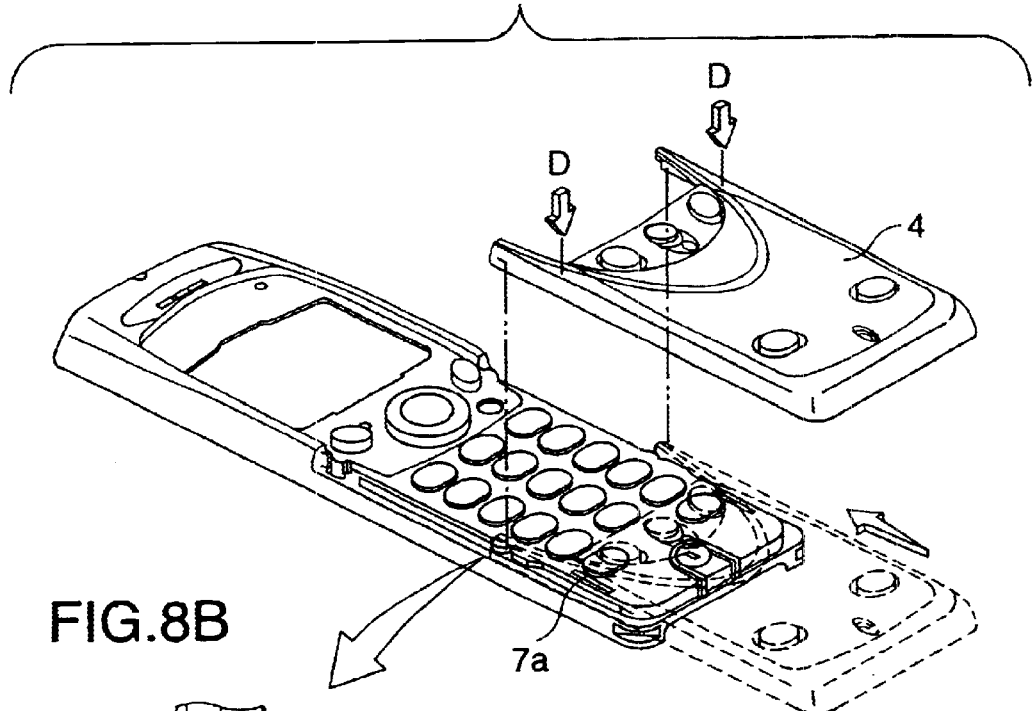
FIG. 8A is a perspective view of the portable radio device according to the second embodiment in the state with the cover detached.

In mounting the detached cover 4 on the housing 1 again, as shown in FIG. 8A, the rail 17 of the cover 4 is fitted onto the rail 7 of the housing 1 by applying a force from the arrow D direction.

Figure 8B:
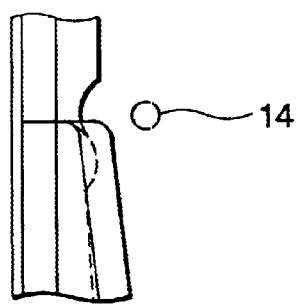
FIG. 8B is an enlarged view showing a lock position indicating part.
Figure 8C:
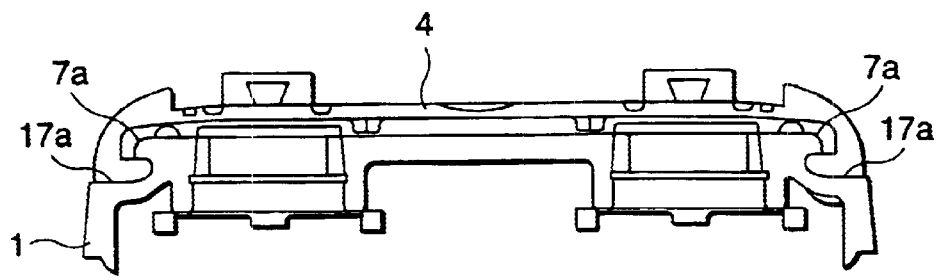
FIG. 8C is a cross-sectional view showing a chamfer part for attachment or detachment.
Figure 9:
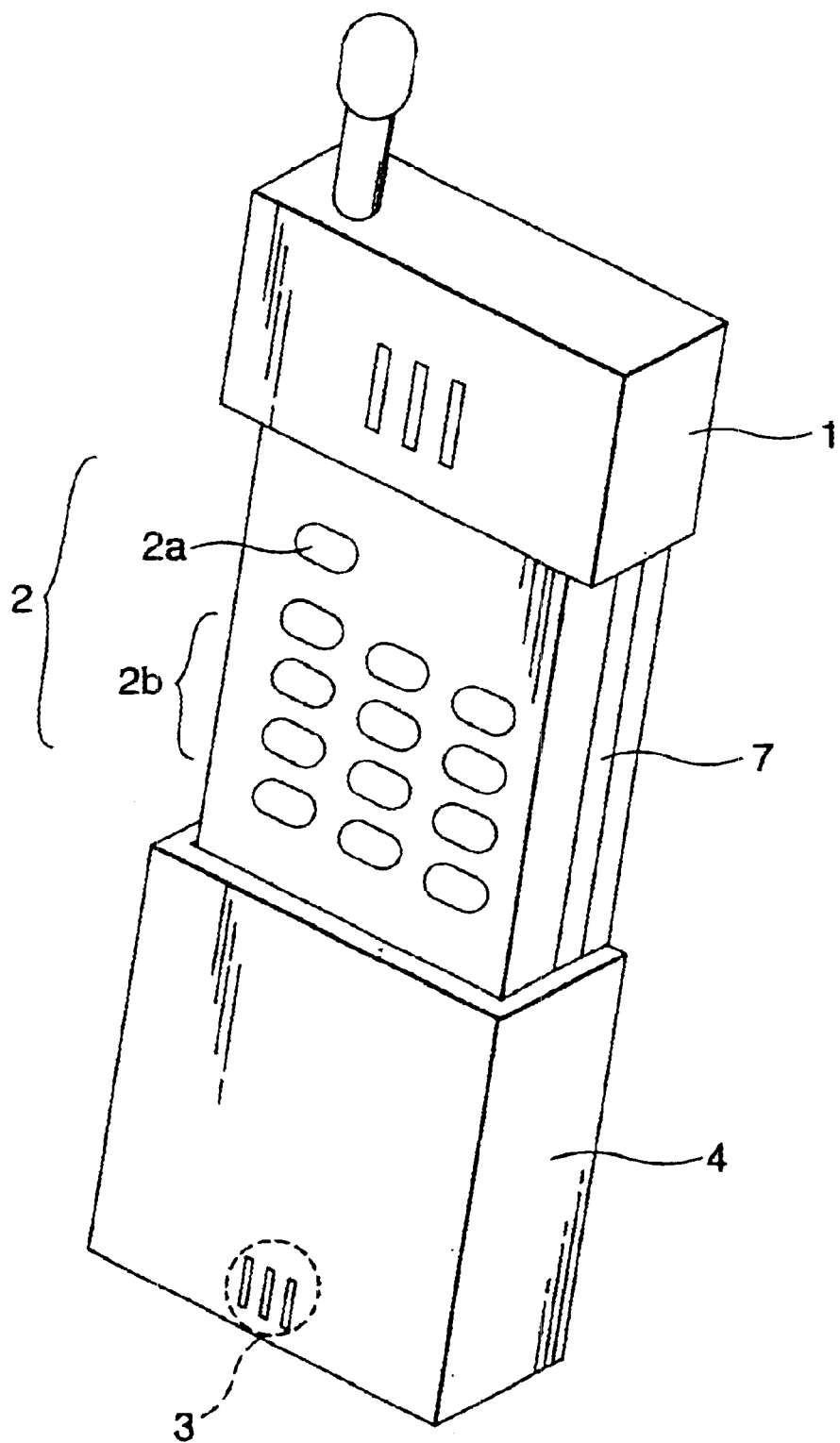
FIG. 9 is a perspective view showing a conventional portable radio device having a slidable cover.

As shown in FIGS. 8A, 8C, in order to mount the cover 4 on the housing 1 smoothly, chamfer parts 7a, 17a are formed in the range of the rails 7, 17 to be engaged in the state with the cover 4 most spread with respect to the housing 1.

Accordingly, by superimposing the cover 4 on the housing 1 such that the chamfer part 17a of the detached cover 4 is contacted with the chamfer part 7a of the housing 1, and applying a force thereon from the vertical direction with respect to the cover surface, the rail 17 of the cover 4 is fitted beneath the rail of the housing 7 so that the cover 4 is mounted on the housing 1.

According to the configuration, the cover 4 can be attached or detached easily. And further, even in the case an excessive force is applied from the outside in the state with the cover 4 opened, breakage can be prevented owing to the detachment of the cover.

Moreover, as shown in FIG. 8B in the enlarged state, an indication 14 is provided at a position on the housing whereat the cover 4 is to be locked. Since the user can adjust the sliding distance of the cover 4 or position the mounting position of the cover 4 based on the indication 14, the operativity can be improved.

The indication 14 can be provided by any means, such as forming a projecting part on the housing, forming a recess part, applying a character, printing, or the like. Furthermore, the indication 14 can be provided to each locking position, or only at one locking position.

Accordingly, since the movement of the cover 4 is locked both in the state with the cover 4 closed for carriage and in the state with the cover 4 opened for operating the ten keys in the portable radio device, the operativity can be improved.

Moreover, since the locking nails 10 are formed integrally with the cover so as to provide the locking mechanism, utilizing the elasticity of the cover, a simple configuration can be provided with a reduced number of the components, and further, the risk of breakage can be reduced.

Furthermore, since the stopper projections 12 having the backlash preventing parts 12b are provided, even if the cover is opened for the key operation, there is no risk of backlash or fall-off of the cover.

Moreover, the operation of attaching or detaching the cover onto the housing can be executed smoothly.

Although the stopper projections having the backlash preventing parts are provided on the housing side here, they can be provided on the cover side with the stopper projections 22 of FIG. 2 provided on the housing side. As apparent from the explanation above, the portable radio device according to the invention allows the key operation or the communication in the carriage state with the slide cover closed.

Furthermore, since the pressing parts or the locking nails of the cover are formed integrally with the cover, a simple configuration can be provided with a small number of the components, and further, the risk of breakage or malfunction is low.

Moreover, a portable radio device with a smaller size, excellent operativity, a wide designing freedom, and little communication quality deterioration can be realized.

What is claimed is:

1. A portable radio device comprising:
   a housing having a key operation part;
   a cover for covering the key operation part; and
   at least a key pressing part formed integrally with the cover,
   wherein the cover is slidable between a first end where the key operation part is covered and a second end where a part of the key operation part is exposed,
   wherein the key pressing part is at a position corresponding at least a first key of the key operation part when the cover is disposed at the first end.

2. The portable radio device according to claim 1,
   wherein the keys in the key operation parts to be operated by the key pressing part include a transmission starting key.

3. The portable radio device according to claim 1,
   wherein the key pressing parts are formed integrally with the cover by a two-color molding method using a resin comprising the cover and an elastomer resin comprising the key pressing parts.

4. A portable radio device comprising:
   a housing having a key operation part;
   a cover for covering the key operation part; and
   at least a key pressing part formed integrally with the cover,
   wherein the cover is slidable between first end where the key operation part is covered and second end where a part of the key operation part is exposed,
   wherein the key pressing part is at a position corresponding at least a key of the key operation part when the cover is disposed at the first end or the second end,
   wherein the cover further comprises a press preventing projecting part at a position of at least one of the key pressing parts not corresponding to a key when there are key pressing parts corresponding to a key of the key operation part only in the either state the cover is located at the first end or second end.

5. A portable radio device comprising:
   a housing having a key operation part;
   a cover for covering the key operation part; and
   at least a key pressing part formed integrally with the cover,
   wherein the cover is slidable between first end where the key operation part is covered and second end where a part of the key operation part is exposed,
   wherein the key pressing part is at a position corresponding at least a key of the key operation part when the cover is disposed at the first end or the second end,
   wherein the housing further comprises a transmitter portion,
   wherein the cover further comprises a transmitting opening provided on the cover,
   wherein the transmitting opening is at a position corresponding to the transmitter part when the cover is located at the first end or second end.

6. The portable radio device according to claim 5,
   wherein the cover further comprises a second transmitting opening at a position corresponding to the transmitter part when the cover is located at another end.

7. The portable radio device according to claim 5,
   wherein the cover further comprises a cylindrical rib surrounding at least one of the transmitting openings at the side facing to the transmitting part.

8. The portable radio device according to claim 7,
   wherein the housing comprises a rib to be fitted with the cylindrical rib provided in the cover, surrounding the transmitting part.

9. The portable radio device according to claim 5,
   wherein the housing comprises a cylindrical rib surrounding the transmitting part.

10. The portable radio device according to claim 9,
    wherein the lock mechanism further comprises:
      nail parts formed in the cover; and
      lock parts formed in the housing to be engaged with the nail parts,
        wherein the nail parts disposed at the tip of an arm part elongating from the end of the cover so as to be engaged with the lock parts, utilizing the elasticity of the cover.

11. The portable radio device according to claim 10, wherein the rail and the lock parts of the lock mechanism are formed integrally in the housing, and the rail and the nail parts of the lock mechanism are formed integrally in the cover.

12. The portable radio device according to claim 9, wherein projections are provided both in the surface of the housing facing to the cover and in the surface of the cover facing to the housing to be engaged in the state the cover is most spread with respect to the housing for preventing fall-off of the cover from the housing.

13. The portable radio device according to claim 12, wherein a projecting shape for forcing up the other projection is added to one of the projections provided in the housing and the cover for preventing backlash of the cover in the state most spread with respect to the housing.

14. The portable radio device according to claim 5, wherein the cover and the housing comprise:
    rails with the cover slidably with respect to the housing in the state the rails are engaged; and
    a lock mechanism for fixing the cover to the housing when the cover is located at the first end and when the cover is located at the second end.

15. The portable radio device according to 14, wherein chamfer parts are provided in the range of the rails of the cover and the housing, engaged in the state the cover is most spread with respect to the housing for facilitating attachment or detachment of the cover.

16. The portable radio device according to claim 14, wherein the position for locking the slide of the cover is indicated at least at one point of the housing.

17. The portable radio device according to claim 14, wherein the position for locking the slide of the cover is indicated at least at one point of the housing.

18. A portable radio device comprising:
    a housing having a key operation part;
    a cover for covering the key operation part;
    a transmitter part provided on the housing; and
    a first transmitting opening provided on the cover;
    wherein the cover is slidable between a first end where the key operation part is covered and a second end where a part of the key operation part is exposed,
    wherein the first transmitting opening is formed at a position corresponding the transmitter part when the cover is located at the first end or the second end.

19. The portable radio device according to claim 18, wherein the cover further comprises a second transmitting opening at a position corresponding to the transmitter part when the cover is located at another end.

20. The portable radio device according to claim 19, wherein the cover further comprises a first rib formed around at least one of the first transmitting opening and the second transmitting opening at the side facing to the transmitting part.

21. The portable radio device according to claim 20, wherein the housing further comprises a second rib to be fitted with the first rib provided on the cover.

22. The portable radio device according to claim 20, wherein the first rib has a cylindrical shape surrounding at least one of the first transmitting opening and the second transmitting opening.

23. The portable radio device according to claim 20, wherein the transmitting part is inclined toward a lower bottom face of the housing.

24. The portable radio device according to claim 20, wherein the transmitting part includes a transmitter provided in the housing and the second transmitting opening provided on the housing,
    wherein the first transmitting opening has a wider area than the second transmitting opening.

25. The portable radio device according to claim 18, wherein the housing further comprises a third rib formed around the transmitting part.

26. The portable radio device according to claim 25, wherein the third rib has a cylindrical shape surrounding the transmitting part.

27. The portable radio device according to claim 17, wherein the cover and the housing comprise:
    rails with the cover slidably with respect to the housing in the state the rails are engaged; and
    a lock mechanism for fixing the cover to the housing when the cover is located at the first end and when the cover is located at the second end.

28. The portable radio device according to claim 27, wherein the lock mechanism further comprises:
    nail parts formed in the cover; and
    lock parts formed in the housing to be engaged with the nail parts,
    wherein the nail parts disposed at the tip of an arm part elongating from the end of the cover so as to be engaged with the lock parts, utilizing the elasticity of the cover.

29. The portable radio device according to claim 28, wherein the rail and the lock parts of the lock mechanism are formed integrally in the housing, and the rail and the nail parts of the lock mechanism are formed integrally in the cover.

30. The portable radio device according to claim 27, wherein projections are provided both in the surface of the housing facing to the cover and in the surface of the cover facing to the housing to be engaged in the state the cover is most spread with respect to the housing for preventing fall-off of the cover from the housing.

31. The portable radio device according to claim 30, wherein a projecting shape for forcing up the other projection is added to one of the projections provided in the housing and the cover for preventing backlash of the cover in the state most spread with respect to the housing.

32. The portable radio device according to 27, wherein chamfer parts are provided in the range of the rails of the cover and the housing, engaged in the state the cover is most spread with respect to the housing for facilitating attachment or detachment of the cover.

33. The portable radio device according to claim 27, wherein the position for locking the slide of the cover is indicated at least at one point of the housing.

34. A portable radio device comprising:
    a housing having a key operation part;
    a slidable cover for covering an optional portion stored in the housing;
    the cover and the housing further comprising:
    rails where the cover is slidable with respect to the housing when the rails are engaged with the cover; and
    a lock mechanism for fixing the cover to the housing at least in the state a part of the key operation part is covered by the cover and the state the cover is moved to an optional position, wherein the lock mechanism provided with the cover is located at an arm part, said arm part is formed integrally with the cover and elongating from both ends of side surfaces of the cover.

35. The portable radio device according to claim 34, wherein projections are provided both in the surface of the housing facing to the cover and in the surface of the cover facing to the housing to be engaged in the state the cover is most spread with respect to the housing for preventing fall-off of the cover from the housing.

36. The portable radio device according to 34, wherein chamfer parts are provided in the range of the rails of the cover and the housing, engaged in the state the cover is most spread with respect to the housing for facilitating attachment or detachment of the cover.

37. A portable radio device comprising:

a housing having a key operation part;

a slidable cover for covering an optional portion stored in the housing;

the cover and the housing further comprising:
  rails where the cover is slidable with respect to the housing when the rails are engaged with the cover; and
  a lock mechanism for fixing the cover to the housing at least in the state a part of the key operation part is covered by the cover and the state the cover is moved to an optional position, wherein the lock mechanism provided with the cover is located at an arm part, said arm part is formed integrally with the cover and extending from both ends of side surfaces of the cover further comprises:
  nail parts formed at a tip of the arm part; and
  lock parts formed in the housing to be engaged with the nail parts.

38. The portable radio device according to claim 37, wherein the rail and the lock parts of the lock mechanism are formed integrally in the housing, and the rail and the nail parts of the lock mechanism are formed integrally in the cover.

39. A portable radio device comprising:

a housing having a key operation part;

a slidable cover for covering an optional portion stored in the housing;

the cover and the housing further comprising:
  rails with the cover slidably with respect to the housing in the state the rails are engaged; and
  a lock mechanism for fixing the cover to the housing at least in the state the stored portion is covered by the cover and the state the cover is moved from the state to an optional position, wherein projections are provided both in the surface of the housing facing to the cover and in the surface of the cover facing to the housing to be engaged in the state the cover is most spread with respect to the housing for preventing fall-off of the cover from the housing, wherein a projecting shape for forcing up the other projection is added to one of the projections provided in the housing and the cover for preventing backlash of the cover in the state most spread with respect to the housing.

40. A portable radio device comprising:

a housing having a key operation part;

a slide cover for covering the key operation part;

a transmitter part provided on the housing;

a transmitting opening provided on the slide cover; and a rib provided on the slide cover at a position around the transmitting opening at the side facing to the transmitting part.

41. The portable radio device according to claim 40, wherein the transmitting part is inclined toward a lower bottom face of the housing.

42. The portable radio device according to claim 40, wherein the transmitting part includes a transmitter provided in the housing and a second transmitting opening provided on the housing, wherein the transmitting opening has a wider area than the second transmitting opening.

* * * * *

UNITED STATES PATENT AND TRADEMARK OFFICE
CERTIFICATE OF CORRECTION

PATENT NO. : 6,643,529 B1
DATED : November 4, 2003
INVENTOR(S) : Yukinari Inoue et al.

It is certified that error appears in the above-identified patent and that said Letters Patent is hereby corrected as shown below:

Column 9,
Line 63, after "at the first end", please insert -- , wherein the key pressing part is at a position corresponding to a second key of the key operation part when the cover is located at the second end --.

Column 12,
Line 13, please delete "according to claim 17", and insert therefor -- according to claim 18 --.

Signed and Sealed this

Sixteenth Day of March, 2004

JON W. DUDAS
*Acting Director of the United States Patent and Trademark Office*